(12) United States Patent
Bakkali

(10) Patent No.: US 10,529,456 B2
(45) Date of Patent: Jan. 7, 2020

(54) SYSTEM FOR CONTROLLING A NUCLEAR REACTOR CORE

(71) Applicant: COMMISSARIAT A L'ENERGIE ATOMIQUE ET AUX ENERGIES ALTERNATIVES, Paris (FR)

(72) Inventor: Mounir Bakkali, Meudon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 154 days.

(21) Appl. No.: 14/783,976

(22) PCT Filed: Apr. 22, 2014

(86) PCT No.: PCT/EP2014/058134
§ 371 (c)(1),
(2) Date: Oct. 12, 2015

(87) PCT Pub. No.: WO2014/173894
PCT Pub. Date: Oct. 30, 2014

(65) Prior Publication Data
US 2016/0071622 A1  Mar. 10, 2016

(30) Foreign Application Priority Data
Apr. 25, 2013 (FR) .................................... 13 53794

(51) Int. Cl.
*G21C 7/36* (2006.01)
*G21C 17/00* (2006.01)

(52) U.S. Cl.
CPC .............. *G21C 7/36* (2013.01); *G21C 17/00* (2013.01)

(58) Field of Classification Search
CPC ...... G21C 17/104; G21C 17/108; G21C 7/36; G21D 3/00
See application file for complete search history.

(56) References Cited

U.S. PATENT DOCUMENTS

| 4,920,548 A | * | 4/1990 | Gaussa, Jr. | ............... G01T 3/00 250/336.1 |
| 5,098,639 A | | 3/1992 | Bacconnet et al. | |
| 2011/0274230 A1 | * | 11/2011 | Oriol | ........................ G01T 3/00 376/255 |

OTHER PUBLICATIONS

French Preliminary Search Report dated Jan. 7, 2014 in Patent Application No. 1353794 (with English translation of categories of cited documents).

(Continued)

*Primary Examiner* — Jack W Keith
*Assistant Examiner* — Sandra Herrick
(74) *Attorney, Agent, or Firm* — Oblon, McClelland, Maier & Neustadt, L.L.P.

(57) ABSTRACT

The invention relates to a system for the monitoring and control of the core of a nuclear reactor along which N fission chambers $CF_i$ (i=1, 2, ..., N) are positioned, N being an integer number greater than or equal to 2, in which:

computing means (P) are able to compute a statistical estimation of the $n^{th}$ order neutron flux $\widehat{K}_{n\,CFi}$ of each fission chamber $CF_i$ and a mean value of estimation of the neutron flux $\overline{\widehat{K}_n}$ that represents the mean neutron flux prevailing in the core of the nuclear reactor, such that $$\overline{\widehat{K}_n} = \frac{1}{N}\sum_{i=1}^{N} \widehat{K}_{n\,CFi} \text{ and}$$

computing means (M, CMP) are able to compute an ageing indicator (S) for the fission chamber $CF_i$ from the statistical estimation value of the neutron flux $\widehat{K}_{n\,CFi}$ of the fission chamber $CF_i$.

2 Claims, 5 Drawing Sheets

(56) References Cited

OTHER PUBLICATIONS

International Search Report and Written Opinion dated Jun. 25, 2014 in PCT/EP2014/058134 (with partial English language translation).

Stéphane Normand, "Habilitation à diriger des recherches—Instrumentation nucleaire pour les systemes industriels de mesure" Retrieved from the Internet: [http://tel.archives-ouvertes.fr/docs/00/67/48/95/PDF/Normand_2010g.pdf], XP055091580, Feb. 28, 2012, 163 Pages (with English Abstract).

Hu Ping, et al., "Identification of aging and damage of neutron measurement probe of PRN system in Daya Bay nuclear power station" Nuclear Power Engineering, vol. 30, No. 1, Feb. 2009, 1 Page (English Abstract only).

\* cited by examiner

SYSTEM FOR CONTROLLING A NUCLEAR REACTOR CORE

TECHNICAL FIELD AND PRIOR ART

The invention relates to a system for controlling a nuclear reactor core.

The monitoring and protection of the core nuclear reactors in nuclear power stations are provided, at intermediate power and high power, by means of multisection neutron detectors distributed over the entire height of the reactor core. They deliver a continuous current that measures the neutron flux and consequently the axial power distribution of the core of the nuclear reactor.

In order to guarantee correct power measurements, a procedure for replacing the neutron detectors is established as soon as the response thereof changes according to a predetermined criterion.

This replacement procedure is described in the article entitled "*Identification of ageing and damage of neutron measurement probe of PRN system in Daya Bay nuclear power station*" (Hu-Ping; Zhao-Fuyu/*Nuclear Power Engineering*, vol. 30, no. 1, pages 95-99). The criterion chosen for replacing the detectors is correlated to the ageing thereof. This criterion does not however make it possible to reliably define an actual limit of correct functioning of the detectors. Moreover, this control procedure makes it necessary, for measuring the correct-functioning criterion, to disconnect the nuclear chain.

The control system of the invention does not have the drawbacks mentioned above.

DISCLOSURE OF THE INVENTION

The invention relates to a system for controlling a nuclear reactor core, characterised in that it comprises:

N fission chambers $CF_i$ (i=1, 2, ..., N) positioned along the nuclear reactor core, N being an integer number greater than or equal to 2, each fission chamber delivering a current representing a detection of neutrons coming from the core of the nuclear reactor, voltage conversion means able to convert into voltages the currents representing the detections of neutrons, analogue to digital conversion means able to digitise, simultaneously, under the action of the same clock signal, the voltages delivered by the voltage conversion means, computing means able to compute a statistical estimation of the $n^{th}$ order neutron flux $\widehat{K_{n\,CFi}}$ of each fission chamber $CF_i$ (i=1, 2, ..., N) and a mean value of estimation of the neutron flux $\overline{\widehat{K_n}}$ that represents the mean neutron flux prevailing in the core of the nuclear reactor, such that $$\overline{\widehat{K_n}} = \frac{1}{N}\sum_{i=1}^{N} \widehat{K_{n\,CFi}} \text{ and}$$

computing means able to compute an indicator of ageing of the fission chamber $CF_i$ (i=1, 2, ..., N) from the statistical estimation value of the neutron flux $\widehat{K_{n\,CFi}}$.

The statistical estimation value of the neutron flux of order n, $\widehat{K_{n\,CFi}}$, of the fission chamber $CF_i$ is, by definition, the $n^{th}$ order cumulant estimator associated with the fission chamber $CF_i$.

The means able to compute an ageing indicator for a fission chamber $CF_i$ comprise:

computing means able to calculate a variance $Var(\widehat{K_{n\,CFi}})$ such that:

$$Var(\widehat{K_{n\,CFi}}) = \frac{1}{R}\sum_{j=1}^{R} \widehat{K_n}^2_{j\,CFi} - (\overline{\widehat{K_n}}_{CFi})^2; \text{ with}$$

$$\overline{\widehat{K_n}}_{CFi} = \frac{1}{R}\sum_{j=1}^{R} \widehat{K_n}_{j\,CFi}$$

where R is an estimation value number chosen for computing the variance and for computing the mean of the statistical estimation values of the neutron flux associated with each fission chamber $CF_i$ (i=1, 2, ..., N);

computing means able to compute, from the variance $Var(\widehat{K_{n\,CFi}})$, a quantity $$\sigma_{\widehat{K_{n}}_{CFi}}$$

% that is the relative standard deviation as a percentage of the estimator of the counting rate associated with the estimation value of the neutron flux $\widehat{K_{n\,CFi}}$ of the fission chamber $CF_i$, such that:

$$\sigma_{\hat{\lambda}_{K_{n\,CFi}}}\% = 100 \cdot \sqrt{\frac{Var(\hat{\lambda}_{n_i})}{\lambda^2}}, \text{ with}$$

$$Var(\hat{\lambda}_{n_i}) = \frac{Var(\widehat{K_{n\,CFi}})}{\left(\int_0^\infty h_i(t)^n \cdot dt\right)^2}, \text{ and}$$

$$\hat{\lambda}_{n_i} = \frac{\widehat{K_{n\,CFi}}}{\int_0^\infty h_i(t)^n \cdot dt} \text{ where}$$

$h_i(t)$ is the mean theoretical pulse response of the fission chamber CFi, and $\hat{\lambda}_{n_i}$ is the estimator of the counting rate $\lambda$ associated with the $n^{th}$ order cumulant and with the chamber CFi, and comparison means able to deliver the ageing indicator on the basis of a comparison between the quantity $$\sigma_{\hat{\lambda}_{K_{n\,CFi}}}$$

% and a threshold $\sigma_0$.

According to an additional feature of the invention, the $n^{th}$ order is equal to 2 or 3.

The monitoring and control system of the invention advantageously defines an objective qualitative indicator sensitive to the degradation related to the ageing of the fission chambers.

Advantageously, the change and degradation in the fission chambers are monitored without disconnecting the nuclear chain and without making the system complex. Advantageously, also, the ageing indicator of the invention is formed from estimation values of the neutron flux that are used, moreover, for monitoring and protecting the core of the nuclear reactor.

BRIEF DESCRIPTION OF THE FIGURES

Other features and advantages of the invention will emerge from a reading of a preferential embodiment given with reference to the accompanying figures, among which.

% as a function of the counting rate $\lambda$ in the case where n is respectively equal to 2 and to 3.

In all the figures, the same references designate the same elements.

DETAILED DISCLOSURE OF A PARTICULAR EMBODIMENT OF THE INVENTION

Figure 1:
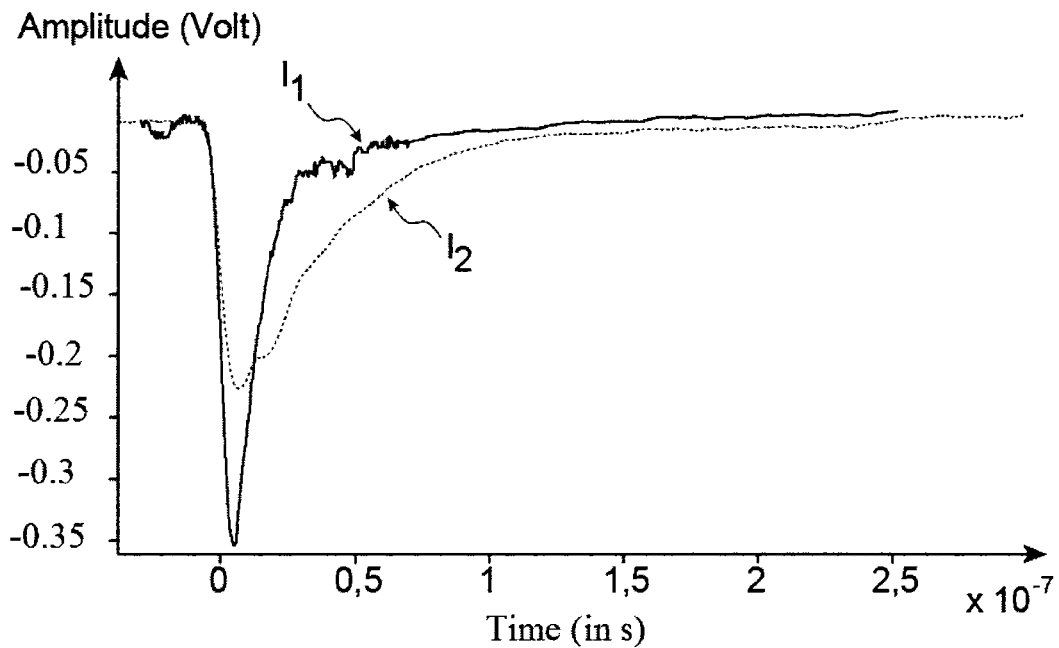
FIG. 1 shows the measured mean pulse response of a fission chamber according to the ageing of the fission chamber.

FIG. 1 shows, by way of non-limitative example, the measured mean pulse response of a fission chamber exposed to a neutron flux of $10^{14}$ n·cm$^{-2}$·s$^{-1}$ according to the ageing of the fission chamber.

The ageing of the detector gives rise to a modification to the form of the pulse response. The curve $I_1$ represents a mean pulse measurement of the fission chamber exposed to the neutron flux after 0 hours of operation and the curve $I_2$ represents a mean pulse measurement of the same fission chamber exposed to a neutron flux of the same intensity, after 500 hours of operation. A broadening of the pulse response is observed. This broadening of the pulse response is related to the slowing down in the collection of charges, said slowing down of collection being due to the presence of gaseous contaminants (the presence of oxygen and gaseous fission products that slow down the collection of the charges in the interelectrode space). However, the integral of the system (i.e. the quantity of charges) is preserved for a pulse corresponding to a given fission product of given energy. The direct consequence of this is reducing the amplitude of the pulse response in terms of absolute value.

Figure 2:
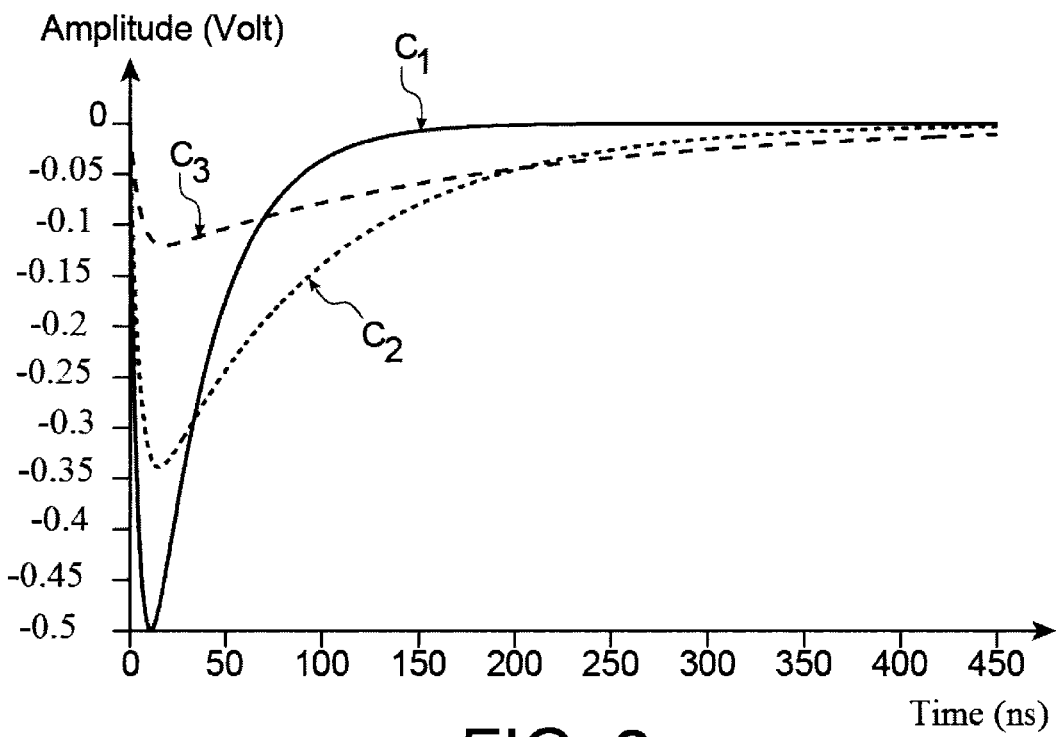
FIG. 2 shows the mean theoretical pulse response of a fission chamber according to the ageing of the fission chamber.

FIG. 2 shows a mean theoretical pulse response of the fission chamber exposed to a neutron flux of given intensity, as a function of ageing. The curve $C_1$ corresponds to an ageing of 0 hours, the curve $C_2$ corresponds to an ageing of 500 hours and the curve $C_3$ corresponds to an ageing of 2000 hours.

For the example of a mean theoretical pulse response shown in FIG. 2, the Applicant has chosen to formulate the mean theoretical pulse response h(t) with the following equation:

$$h(t) = A(e^{-\theta_1 t} - e^{-2t}), \text{ where}$$

A is the parameter for the amplitude of the mean theoretical pulse response, and $\theta_1$ and $\theta_2$ are temporal parameters particular to the mean theoretical pulse response.

Table 1 below contains all the values chosen for the parameters A, $\theta_1$ and $\theta_2$ for the respective ageings of 0 hours, 500 hours and 2000 hours.

TABLE 1

|  | A | $\theta_1$ | $\theta_2$ |
|---|---|---|---|
| 0 hours | $8.35 \times 10^{-1}$ V | $2 \times 10^8$ s$^{-1}$ | $3.12 \times 10^7$ s$^{-1}$ |
| 500 hours | $4.25 \times 10^{-1}$ V | $2 \times 10^8$ s$^{-1}$ | $1.11 \times 10^7$ s$^{-1}$ |
| 2000 hours | $1.37 \times 10^{-1}$ V | $2 \times 10^8$ s$^{-1}$ | $5.55 \times 10^6$ s$^{-1}$ |

A comparison of the curves shown in FIGS. 1 and 2 shows the relevance of the choice of mean theoretical pulse response made by the Applicant.

According to other embodiments of the invention corresponding to the use of other fission chambers, the mean theoretical pulse response can be formulated by means of other equations.

By way of non-limitative example, another formulation of the mean theoretical pulse response is written:

$$h(t) = -(a0 + a1*\cos(t*w) + b1*\sin(t*w) + a2*\cos(2*t*w) + b2*\sin(2*t*w) + a3*\cos(3*t*w) + b3*\sin(3*t*w) + a4*\cos(4*t*w) + b4*\sin(4*t*w) + a5*\cos(5*t*w) + b5*\sin(5*t*w) + a6*\cos(6*t*w) + b6*\sin(6*t*w) + a7*\cos(7*t*w) + b7*\sin(7*t*w) + a8*\cos(8*t*w) + b8*\sin(8*t*w))$$

with a0=−0.005074; a1=0.007115; b1=−0.004424; a2=−0.001363;

b2=0.004398; a3=−0.001274; b3=−0.001514; a4=0.0006596;

b4=−0.0005217; a5=0.000321; b5=0.0004012; a6=−0.0002987;

b6=0.0001253; a7=−6.404 10$^{-5}$; b7=−0.0002095; a8=0.0001235;

b8=−4.158 10$^{-5}$; and w=3.484 10$^{+7}$

In general, in the context of the invention, the choice of the mean theoretical pulse response is essentially guided by the modification in form that the pulse response undergoes according to the ageing rather than by the form itself of the pulse response. It is in fact the choice of this change of form that makes it possible to obtain a relevant fission chamber ageing indicator.

Figure 3:
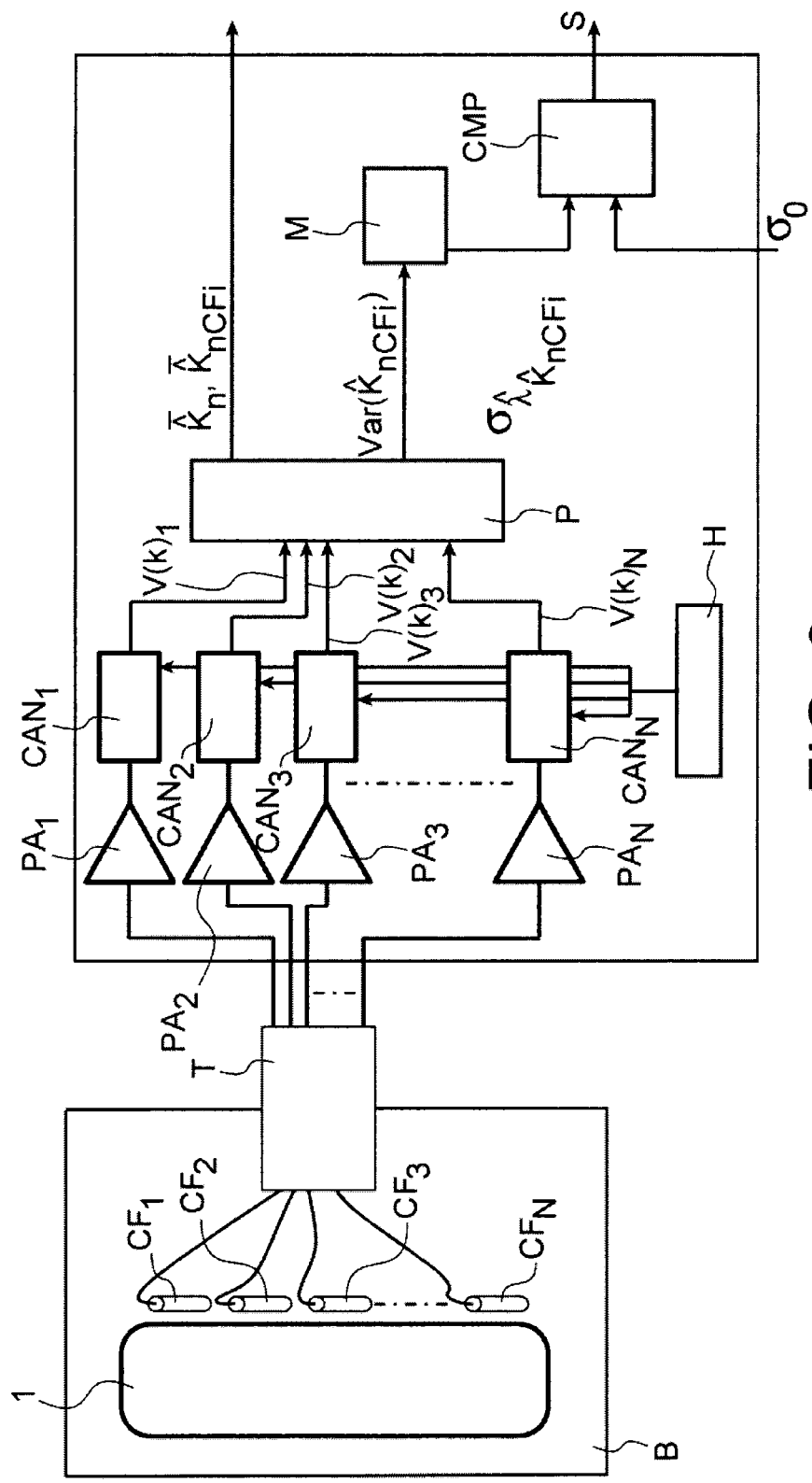
FIG. 3 is an outline diagram of the monitoring and control system of the invention.

FIG. 3 shows a monitoring and control system of the invention.

The monitoring and control system comprises:

a set of N fission chambers $CF_1, CF_2, CF_3, \ldots, CF_N$ that each delivers a detection current signal, connection means T that comprise cables for offsetting the electronics for processing the radiological ambience conditions that exist close to the core of the reactor;

voltage conversion means $PA_1, PA_2, \ldots, PA_N$ able to convert and amplify into voltages the detection currents delivered by the fission chambers, analogue to digital conversion means $CAN_1, CAN_2, \ldots, CAN_N$ able to digitise, simultaneously, under the action of the same clock signal delivered by a clock circuit H, the voltages delivered by the voltage conversion means, and processing means P, M, CMP able to process the digital voltages delivered by the analogue to digital conversion means.

The N fission chambers are positioned along a reactor core 1 placed in a building B. The connection means T extract the detection current signals from the building B. The N detection current signals extracted from the building B constitute the input signals of N current collection preamplifiers $PA_1$, $PA_2$, $PA_3$, ..., $PA_N$ that provide a current to voltage conversion over the entire power dynamic range of the nuclear reactor, for example a dynamic range of 12 decades. The N voltage signals that result from the current to voltage conversion are then digitised, respectively, by means of N analogue to digital converters $CAN_1$, $CAN_2$, $CAN_3$, ..., $CAN_N$ timed simultaneously by the same clock signal delivered by the clock circuit H.

Each digital voltage signal $V(k)_i$ (i=1, 2, ..., N) delivered by the analogue to digital converter $CAN_i$ consists of a succession of digital samples. The N digital voltage signals $V(k)_1$, $V(k)_2$, $V(k)_3$, ..., $V(k)_N$ delivered respectively by the N analogue to digital converters constitute the input signals of the programmable logic circuit P.

The programmable logic circuit P computes, for each digital voltage signal $V(k)_i$ (i=1, 2, ..., N), the statistical estimation value of the neutron flux $\widehat{K_n}_{CFi}$ of the fission chamber $CF_i$. Next, from the N neutron flux statistical estimation values $\widehat{K_n}_{CFi}$ (i=1, 2, 3, ..., N) thus computed, the programmable logic circuit P computes the mean estimation value of the neutron flux $\overline{\widehat{K_n}}$ that represents the mean neutron flux prevailing in the core of the nuclear reactor. This gives:

$$\overline{\widehat{K_n}} = \frac{1}{N} \sum_{i=1}^{N} \widehat{K_n}_{CFi}$$

The statistical estimation value of the neutron flux $\widehat{K_n}_{CFi}$ of the fission chamber $CF_i$ is, by definition, the estimator of the $n^{th}$ order cumulant associated with the fission chamber $CF_i$. According to the preferential embodiment of the invention, the $n^{th}$ order is equal to 2 or 3.

The estimators of the $2^{nd}$ and $3^{rd}$ order cumulants, $\widehat{K_{2CFi}}$ and $\widehat{K_{3CFi}}$, are written respectively:

$$\widehat{K_2}_{CFi} = \frac{1}{N_{ech}(N_{ech}-1)}[N_{ech}S_{2_i} - S_{1_i}^2]$$

$$\widehat{K_3}_{CFi} = \frac{1}{N_{ech}(N_{ech}-1)(N_{ech}-2)}[N_{ech}^2 S_{3_i} - 3N_{ech}S_{2_i}S_{1_i} + 2S_{1_i}^3]$$

with:

$$S_{j_i} = \sum_{k=1}^{N_{ech}} (V(k)_i)^j$$

where $N_{ech}$ is the number of digital samples chosen, to ensure the convergence of the statistical estimator of the neutron flux (typically equal to several thousands), and j is an integer number.

The neutron flux estimation values $\widehat{K_n}_{CFi}$ (i=1, 2, 3, ..., N) are used, in a manner known per se, to provide the monitoring and protection of the core of the nuclear reactor.

On the basis of the statistical estimation values of the neutron flux $\widehat{K_n}_{CFi}$, the programmable logic circuit P also computes, for each fission chamber $CF_i$, the variance $\text{Var}(\widehat{K_n}_{CFi})$ of the $n^{th}$ order estimator chosen.

This gives:

$$\text{Var}(\widehat{K_n}_{CFi}) = \frac{1}{R}\sum_{j=1}^{R} \widehat{K_n}^2_{j_{CFi}} - (\overline{\widehat{K_n}}_{CFi})^2; \text{ with}$$

$$\overline{\widehat{K_n}}_{CFi} = \frac{1}{R}\sum_{j=1}^{R} \widehat{K_n}_{j_{CFi}}$$

where R is the number of estimation values chosen for calculating the variance of the statistical estimator of the $n^{th}$ order neutron flux of the fission chamber $CF_i$.

For each variance $\text{Var}(\widehat{K_n}_{CFi})$ the computing module M then computes the quantity $$\sigma_{\hat{\lambda}_{\widehat{K_n}_{CFi}}}$$

% that is the relative standard deviation as a percentage of the estimator of the counting rate associated with the estimation value of the neutron flux $\widehat{K_n}_{CFi}$ of the fission chamber $CF_i$. This gives:

$$\sigma_{\hat{\lambda}_{\widehat{K_n}_{CFi}}}\% = 100 \cdot \sqrt{\frac{\text{Var}(\hat{\lambda}_{n_i})}{\hat{\lambda}^2}}, \text{ with}$$

$$\text{Var}(\hat{\lambda}_{n_i}) = \frac{\text{Var}(\widehat{K_n}_{CFi})}{(\int_0^\infty h_i(t)^n \cdot dt)^2}, \text{ and}$$

$$\hat{\lambda}_{n_i} = \frac{\widehat{K_n}_{CFi}}{\int_0^\infty h_i(t)^n \cdot dt} \text{ where}$$

$h_i(t)$ is the mean theoretical pulse response of the fission chamber CFi, and $\hat{\lambda}_{n_i}$ is the estimator of the counting rate $\lambda$ associated with the $n^{th}$ order cumulant and with the chamber $CF_i$.

Comparison means CMP deliver the ageing indicator on the basis of a comparison between the quantity $$\sigma_{\hat{\lambda}_{\widehat{K_n}_{CFi}}}$$

% and a threshold $\sigma_0$.

For this purpose, the comparator CMP receives, at its first input, the percentage standard deviation $$\sigma_{\hat{\lambda}_{\widehat{K_n}_{CFi}}}$$

% and, at its second input, the threshold value $\theta_0$. The result of the comparison between $$\sigma_{\hat{\lambda}_{\widehat{K_n}_{CFi}}}$$

% and $\sigma_0$ is a comparison signal S that constitutes the ageing indicator for the fission chamber $CF_i$.

If $$\sigma_{\hat{\lambda}_{\bar{K}_n}_{CFi}}$$

% is greater than or equal to $\theta_0$, it is considered that the fission chamber $CF_i$ has exceeded the allowed ageing period, and if $$\sigma_{\hat{\lambda}_{\bar{K}_n}_{CFi}}$$

% is less than $\sigma_0$, then it is considered that the fission chamber has not reached its allowed ageing period.

Figure 5:
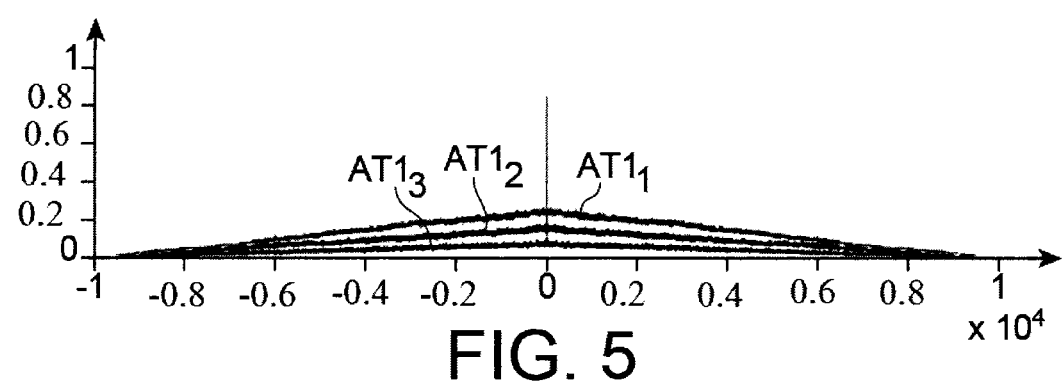
FIGS. 5, 6 and 7 show standardised autocorrelation functions of the output signal of a fission chamber according to ageing.
Figure 6:
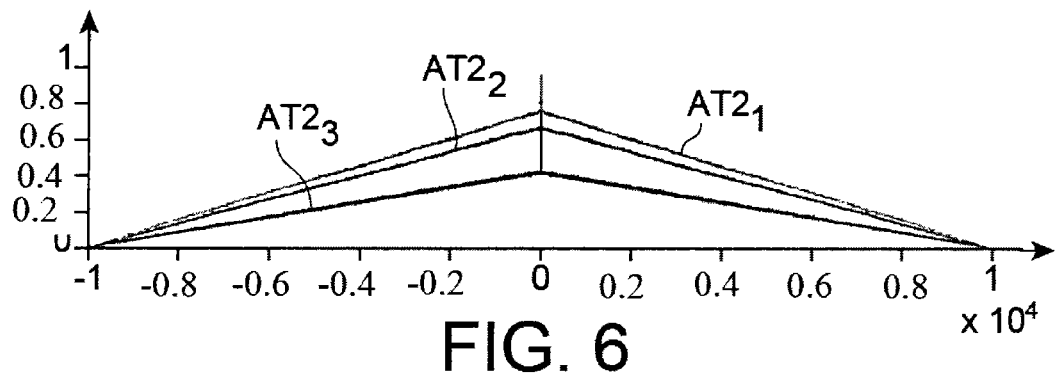
Figure 7:
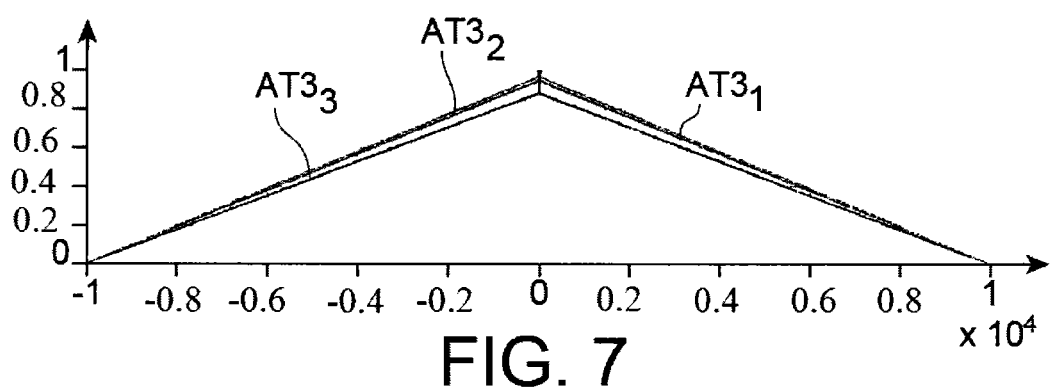

FIGS. 5, 6 and 7 represent standardised autocorrelation functions of the output signal of a fission chamber as a function of the ageing for various counting rate values and for a sampling frequency Fe of the analogue to digital converter CAN of 10 MHz.

Figure 4:
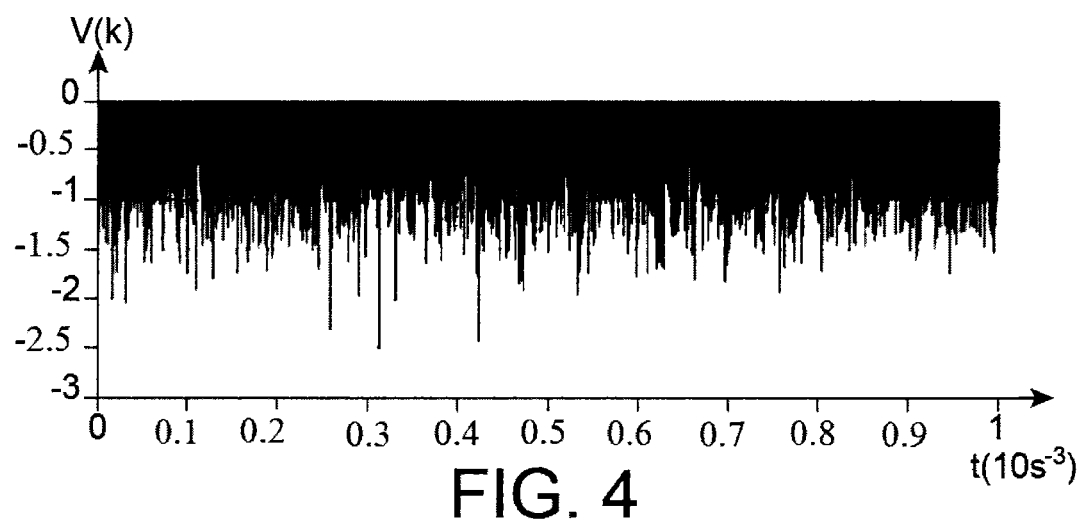
FIG. 4 shows a fission chamber output signal modelled by a Poisson process filtered by the mean theoretical pulse response of the fission chamber, for an ageing value of 0 hours.

The output signal taken into account for establishing these autocorrelation curves is modelled by a Poisson process filtered by the mean theoretical pulse response of the fission chamber at various ageing values (typically 0 hours, 500 hours and 2000 hours). FIG. 4 shows, by way of non-limitative example, the digitised output signal V(k) of a fission chamber for an ageing of 0 hours and a neutron flux rate $\lambda$ of $10^7$ cps (cps standing for "counts per second").

The curves $AT1_1$, $AT1_2$ and $AT1_3$ in FIG. 5 represent respectively the standardised autocorrelation functions of the output signal of a fission chamber for the respective ageings of 0 hours, 500 hours and 2000 hours, under the following conditions:
  neutron fluence rate $\lambda$ equal to $10^6$ cps,
  sampling frequency Fe of the analogue to digital converter CAN equal to 10 MHz,
  duration of observation 1 ms.

The curves $AT2_1$, $AT2_2$ and $AT2_3$ in FIG. 6 represent respectively the standardised autocorrelation functions of the output signal of a fission chamber for the respective ageing of 0 hours, 500 hours and 2000 hours, under the following conditions:
  neutron fluence rate $\lambda$ equal to $10^7$ cps,
  sampling frequency Fe of the analogue to digital converter CAN equal to 10 MHz,
  duration of observation 1 ms.

The curves $AT3_1$, $AT3_2$ and $AT3_3$ in FIG. 7 represent respectively the standardised autocorrelation functions of the output signal of a fission chamber for the respective ageings of 0 hours, 500 hours and 2000 hours, under the following conditions:
  neutron fluence rate $\lambda$ equal to $10^8$ cps,
  sampling frequency Fe of the analogue to digital converter CAN equal to 10 MHz,
  duration of observation 1 ms.

It is clear in FIGS. 5-7 that the standardised autocorrelation function of the fission chamber output signal increases very substantially according to the counting rate $\lambda$. Moreover, an additional increase in the autocorrelation as a function of ageing is also found, said additional increase being ascribable to the change in form of the mean theoretical pulse response of the fission chamber related to the ageing.

Figure 8:
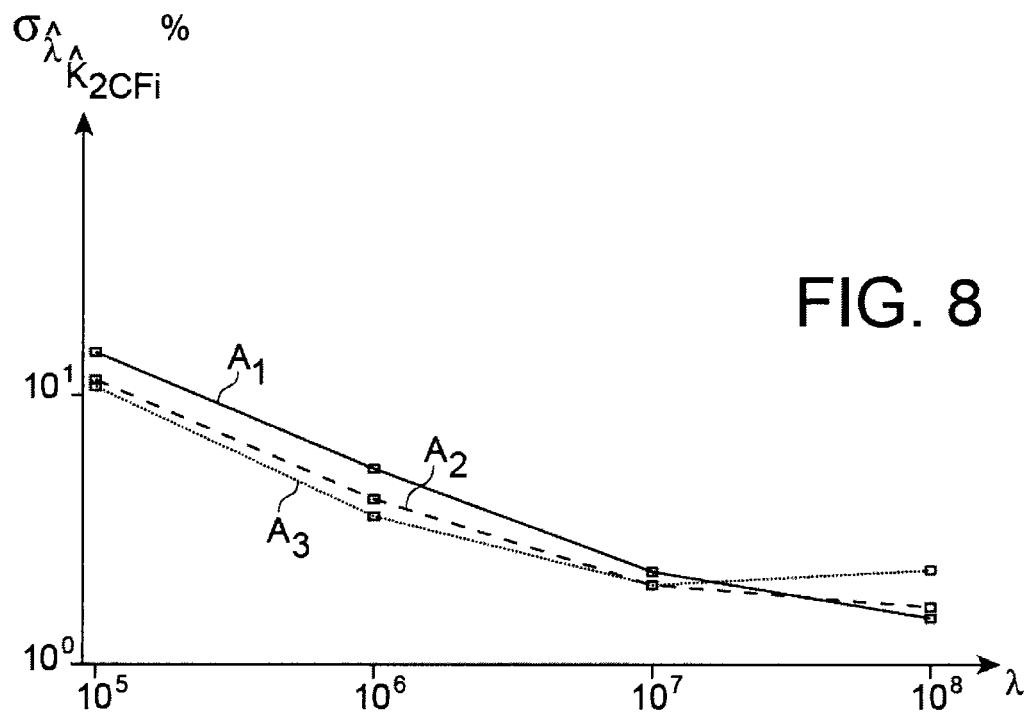
FIGS. 8 and 9 show curves that simulate the change in the quantity $$\sigma_{\hat{\lambda}_{\widehat{k_n}}_{CFi}}$$
Figure 9:
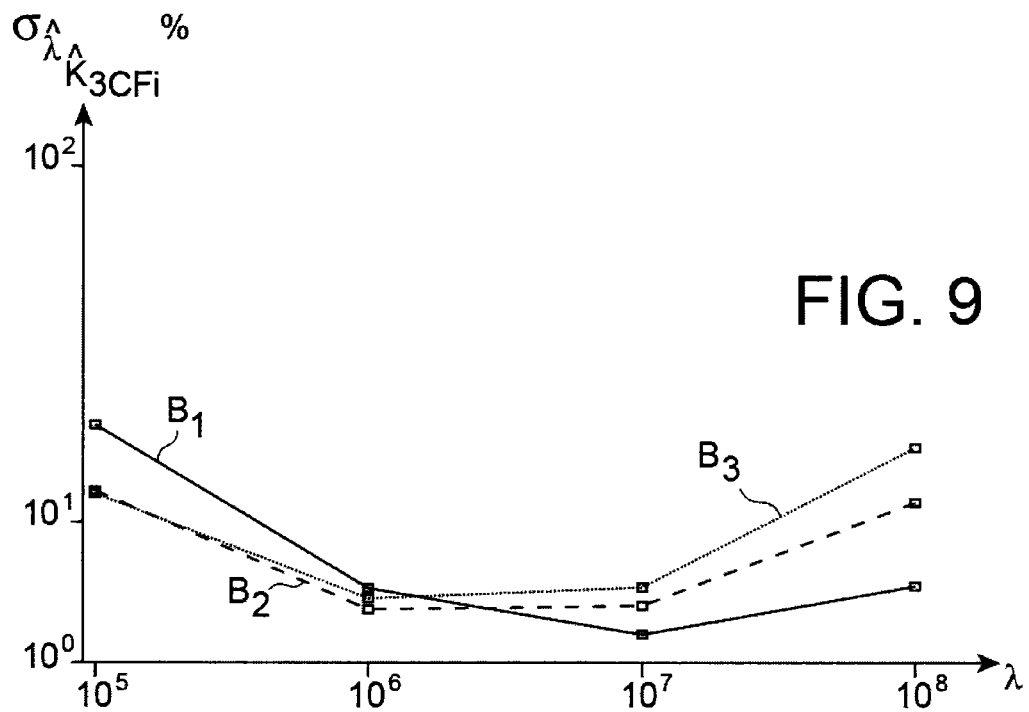

FIGS. 8 and 9 show curves that simulate relative standard deviation changes as a percentage delivered by the monitoring and control system of the invention according to the counting rate.

The curves $A_1$, $A_2$ and $A_3$ in FIG. 8 represent respectively the relative standard deviation as a percentage of the estimator of the counting rate associated with the $2^{nd}$ order estimator $$\sigma_{\hat{\lambda}_{\bar{K}_2}_{CFi}}$$

%, as a function of the counting rate $\lambda$, for a fission chamber $CF_i$, for the respective ageings of 0 hours, 500 hours and 2000 hours, under the following conditions:
  sampling frequency equal to 10 MHz;
  duration of observation 1 ms.

The curves $B_1$, $B_2$ and $B_3$ in FIG. 9 represent respectively the relative standard deviation as a percentage of the estimator of the counting rate associated with the $3^{rd}$ order estimator $$\sigma_{\hat{\lambda}_{\bar{K}_3}_{CFi}}$$

%, as a function of the counting rate $\lambda$, for a fission chamber $CF_i$, for the respective ageings of 0 hours, 500 hours and 2000 hours, under the following conditions:
  sampling frequency equal to 10 MHz;
  duration of observation 1 ms.

From the curves 8 and 9, it is clear that the precision of the estimator of the neutron fluence rate varies according to the choice of the neutron flux estimator.

This is because an additional degradation of 9.2% in precision of the neutron flux is observed between 0 hours and 2000 hours associated with the $3^{rd}$ order estimator for a neutron fluence rate $\lambda$ of $10^8$ cps. On the other hand, this additional degradation in precision between 0 hours and 2000 hours is 0.74% associated with the $2^{nd}$ order estimator for a neutron fluence rate $\lambda$ of $10^8$ cps. The choice of the neutron flux estimator is therefore important. Nevertheless, the additional degradation in precision introduced by the $2^{nd}$ order estimator is not negligible compared for example with the 1% precision sought.

Moreover, the curves 8 and 9 show, for the same neutron fluence rate $\lambda$ of $10^8$ cps, a difference between the relative standard deviation values as a percentage of the estimator of the counting rate at 0 hours and 2000 hours greater at the $3^{rd}$ order than at the $2^{nd}$ order.

This difference is related to the correlation of the samples of the signal $V(k)_i$, the impact of which is the greater as the order adopted for the estimator increases.

The invention claimed is:

1. A system for monitoring aging indicators of fission chambers of a nuclear reactor core, comprising:
   N fission chambers configured to be positioned along the nuclear reactor core, N being an integer number greater than or equal to 2, each of the N fission chambers operating as a neutron detector and being configured to deliver a detection current signal representative of a detection of neutrons coming from the nuclear reactor core,
   N current to voltage converters, each of the N current to voltage converters being configured to convert the detection current signal delivered by a corresponding one of the N fission chambers into a detection voltage signal, N analog to digital converters, each of the N analog to digital converters being configured to digitize the detection voltage signal delivered by a corresponding one of the N current to voltage converters into a digital voltage signal, the N analog to digital converters being timed simultaneously by a same clock signal, a computer configured to compute, for each fission chamber of the N fission chambers:

a statistical estimator $\widehat{K_n}_{CFi}$ representing an estimation of an $n^{th}$ order cumulant of the digital voltage signal corresponding to the fission chamber, where n is equal to 2 or 3, and $CF_i$ represents the respective fission chamber such that i is equal to an integer between 1 and N, inclusive, a variance $\operatorname{Var}(\widehat{K_n}_{CFi})$ of the statistical estimator $\widehat{K_n}_{CFi}$ as:

$$\operatorname{Var}(\widehat{K_n}_{CFi}) = \left(\frac{1}{R}\sum_{j=1}^{R} \hat{K}_{n_{CFi_j}}{}^2\right) - (\overline{\widehat{K_n}}_{CFi})^2$$

with:

$$\overline{\widehat{K_n}}_{CFi} = \frac{1}{R}\sum_{j=1}^{R} \widehat{K_n}_{CFi_j}$$

where R is a number of values of the statistical estimator $\widehat{K_n}_{CFi}$ chosen for computing the variance $\operatorname{Var}(\widehat{K_n}_{CFi})$ of the statistical estimator $\widehat{K_n}_{CFi}$ and j is an integer such that j=1, 2, . . . , R;

a variance $\operatorname{Var}(\hat{\lambda}_{n_i})$ of a statistical estimator $\hat{\lambda}_{n_i}$ of a counting rate $\lambda$ associated with the $n^{th}$ order cumulant and with the fission chamber as:

$$\operatorname{Var}(\hat{\lambda}_{n_i}) = \frac{\operatorname{Var}(\widehat{K_n}_{CFi})}{(\int_0^\infty h_i(t)^n \cdot dt)^2}$$

$h_i(t)$ being a predetermined mean theoretical pulse response of the fission chamber, and $$\hat{\lambda}_{n_i} = \frac{\hat{K}_{n_{CFi}}}{\int_0^\infty h_i(t)^n \cdot dt}$$

a relative standard deviation percentage $$\sigma_{\hat{\lambda}_{\widehat{K_n}_{CFi}}}$$

of the statistical estimator $\hat{\lambda}_{n_i}$ as:

$$\sigma_{\hat{\lambda}_{\widehat{K_n}_{CFi}}} = 100 \cdot \sqrt{\frac{\operatorname{Var}(\hat{\lambda}_{n_i})}{\lambda^2}}$$

where $\lambda$ is the counting rate associated with the fission chamber;

a comparator configured to perform, for each fission chamber of the N fission chambers; a comparison of the relative standard deviation percentage $\sigma_{\hat{\lambda}_{\widehat{K_n}_{CFi}}}$ corresponding to the fission chamber with a predetermined threshold $\sigma_0$, the comparator being farther configured to deliver, for each fission chamber of the N fission chambers, an ageing indicator of the fission chamber based on a result of the comparison, the ageing indicator indicating whether the fission chamber has exceeded its allowed ageing period.

2. The system for monitoring aging indicators of fission chambers of a nuclear reactor core according to claim 1, wherein the statistical estimator $\widehat{K_n}_{CFi}$ for each of the fission chambers is monitored by circuitry configured to process the radiological ambience conditions that exist close to the nuclear reactor core.

* * * * *